US006560302B1

United States Patent
Shim et al.

(10) Patent No.: US 6,560,302 B1
(45) Date of Patent: May 6, 2003

(54) SYNC DETECTION DEVICE FOR AN OPTICAL DISK PLAYER AND METHOD FOR DETECTING SYNC

(75) Inventors: Jae-Seong Shim, Seoul (KR); Il-Yeong Roh, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/218,177

(22) Filed: Dec. 22, 1998

(30) Foreign Application Priority Data

Dec. 26, 1997 (KR) ............................................. 97/74181

(51) Int. Cl.[7] ................................................. H04L 7/00
(52) U.S. Cl. ........................ 375/354; 375/368; 375/376
(58) Field of Search ................................. 375/354, 355, 375/373, 376, 365, 368, 371; 360/51; 369/47.1, 47.15, 47.19, 59.12; 324/76.82

(56) References Cited

U.S. PATENT DOCUMENTS

| 4,471,299 A | * | 9/1984 | Elmis .................... 324/76.82 |
| 5,293,275 A | * | 3/1994 | Kawasaki .................. 360/51 |
| 6,101,230 A | * | 8/2000 | Chun et al. ................. 375/355 |

FOREIGN PATENT DOCUMENTS

| JP | 59-221809 | 12/1984 |
| JP | 61-180967 | 8/1986 |
| JP | 2-206070 | 8/1990 |
| JP | 4-13280 | 1/1992 |
| JP | 6-13897 | 1/1994 |

* cited by examiner

Primary Examiner—Stephen Chin
Assistant Examiner—Chieh M. Fan
(74) Attorney, Agent, or Firm—Staas & Halsey LLP

(57) ABSTRACT

A sync detection device for an optical disk player. The generation of sync insertion signals is stopped when a sync detection signal is normally generated after a sync protection window signal is out of sync with the sync detection signal. A sync insertion and protection device sets a sync protection window according to a sync detection signal from a sync detector in response to a reset signal. The sync insertion and protection device counts a playback clock to generate a sync protection window signal if the count value is coincident with a position where the sync signal is to be generated, and generates a sync insertion signal in response to a sync insertion request. A sync generator outputs the sync protection window signal if the sync detection signal is in sync with the sync protection window signal, and outputs the sync insertion signal if the sync detection signal is out of sync with the sync protection window signal. A sync noise canceller counts the playback clock during generation of the sync detection signal, and generates the reset signal to the sync insertion and protection device if the count value reaches a predetermined value.

5 Claims, 5 Drawing Sheets

SYNC DETECTION DEVICE FOR AN OPTICAL DISK PLAYER AND METHOD FOR DETECTING SYNC

CROSS REFERENCE TO RELATED APPLICATION

This application claims the benefit of Korean Application No. 74181/1997, filed Dec. 26, 1997, in the Korean Patent Office, the disclosure of which is incorporated herein by reference.

BACKGROUND OF THE INVENTION

The present invention relates to an optical disk player, and in particular, to a sync detection device for detecting and generating a sync signal from a signal read from an optical disk.

Known optical disk players includes a sync detection and protection device for detecting a sync signal. The sync detection and protection device minimizes damage to data read from an optical disk.

FIG. 1 is a block diagram of a conventional optical disk player. A pickup 102 reads data recorded on an optical disk 100 and generates an RF (Radio Frequency) signal according thereto. The pickup 102 provides an RF amplifier (RF Amp.) 104 with the RF signal. The RF amplifier 104 amplifies the RF signal and provides the amplified RF signal to a binarizer 106. The binarizer 106 comprises a comparator which converts an RF signal into a string of "1s" and "0s" based upon a level of the RF signal. The binarizer 106 binarizes the output of the RF amplifier to generate serial binary data (SDATA). The SDATA is output to a sync detection and protection device 110. The sync detection and protection device 110 receives the SDATA and a playback clock signal (PLCK) generated from a voltage controlled oscillator (VCO) 108. The sync detection and protection device 110 detects a sync signal from the SDATA and the PLCK signals, and protects the detected sync signal. In case the sync signal is not detected successfully, the sync detection and protection device 110 inserts a sync signal (i.e., generates a sync insertion signal).

The PLCK signal and SDATA are also applied to a phase detector 112. The phase detector 112 compares a phase of the PLCK signal with a phase of the SDATA to detect a phase difference therebetween. The comparison results, i.e., the detected differences, are fed back to the VCO 108 via a lowpass filter 114. When a defect is detected (by a detect detector not shown), the lowpass filter 114 holds its output value. The VCO 108 generates the playback clock (PLCK) according to the output of the lowpass filter 14, in sync with the data read from the disk 100.

FIG. 2 is a block diagram of the sync detection and protection device 110. The sync detection and protection device 110 includes a sync detector 116 and a sync insertion and protection device 124. The sync detector 116 generally comprises: a register 118; a sync pattern decoder 120; and a sync generator 122. The register 118 generally comprises: a serial-input-parallel-output register. The register 118 receives the SDATA, in series, according to the PLCK, and outputs the loaded binary data (SDATA), in parallel, to the sync pattern decoder 120. The sync pattern decoder 120 checks whether the SDATA coincides with the sync pattern and generates a sync detection signal to the sync generator 122 if the SDATA is coincides with the sync pattern.

The sync insertion and protection device 124 counts the playback clock signal (PLCK), and generates a sync protection window signal to the sync generator 122 when the count value corresponds to a position where the sync signal is to be generated. The sync generator 122 checks whether the sync detection signal is generated during generation of the sync protection window signal. The sync generator 122 outputs a sync detection signal, as the sync signal, if the sync detection signal is generated during generation of the sync protection window signal. However, if the sync detection signal is not generated during generation of the sync protection window signal, the sync generator 122 requests the sync insertion and protection device 124 to generate a sync insertion signal, and outputs the sync insertion signal as the sync signal. After outputting a predetermined number of sync insertion signals, the sync generator 122 resets the sync insertion and protection device 124.

In such a conventional system, after the sync protection window signal is out of sync with the sync detection signal, even though the sync detection signal is generated normally, it is unavoidable that the predetermined number of the insertion sync signals will be generated.

Further, after generation of the predetermined sync insertion signals, the sync protection window is reset according to the sync detection signal. At this moment, sync noises may be unexpectedly generated. If sync noises are generated, the sync protection window is erroneously set, and the subsequently generated normal sync detection signals may be misjudged as erroneous sync detection signals. Based on this misjudgment, the sync insertion and protection device 124 will erroneously generate the predetermined number of the sync insertion signals causing damage to the data.

Finally, when a defect is detected, the lowpass filter 114 holds its output. If the held output value is not coincident with an average value, the playback clock PLCK from the VCO 108 becomes out of sync (shifted), which leads to a shift of the positions where the sync protection window signal and the sync insertion signal are generated.

SUMMARY OF THE INVENTION

It is therefore an object of the present invention to provide a sync detection device which stops generating sync insertion signals when a sync detection signal is normally generated after a sync protection window signal goes out of sync with the sync detection signal.

It is another object of the present invention to provide a sync detection device for preventing a sync protection window from being set according to sync noises.

It is still another object of the present invention to provide an optical disk player which prevents a playback clock from being out of sync even when a defect is detected.

According to an aspect of the present invention, a sync detection device for an optical disk player includes a sync detector for detecting a sync signal from a signal read from an optical disk; a sync insertion and protection device for setting a sync protection window according to a sync detection signal from the sync detector in response to a reset signal, counting a playback clock generated from a voltage controlled oscillator to generate a sync protection window signal if the count value is coincident with a position where the sync signal is to be generated, and generating a sync insertion signal in response to a sync insertion request; a sync generator for outputting the sync detection signal if the sync detection signal is in sync with the sync protection window signal, and requesting the sync insertion and protection device to generate the sync insertion signal to output the sync insertion signal if the sync detection signal is out of sync with the sync protection window signal; and a sync noise canceller for counting the playback clock during generation of the sync detection signal, and generating the reset signal to the sync insertion and protection device if the count value reaches a predetermined value.

BRIEF DESCRIPTION OF THE DRAWINGS

The objects and advantages of the present invention will become more apparent by describing in detail a preferred embodiment thereof with reference to the attached drawings in which.

DETAILED DESCRIPTION OF THE PREFERRED EMBODIMENT

A preferred embodiment of the present invention will be described in detail with reference to the attached drawings. Specific details are described in the specification and accompanying drawings to provide a comprehensive understanding of the present invention. However, anyone skilled in the art could implement the present invention without all the details. Accordingly, detailed description of known structures and methods used in the present invention are omitted lest it should obscure the subject matter of the present invention.

Figure 1:
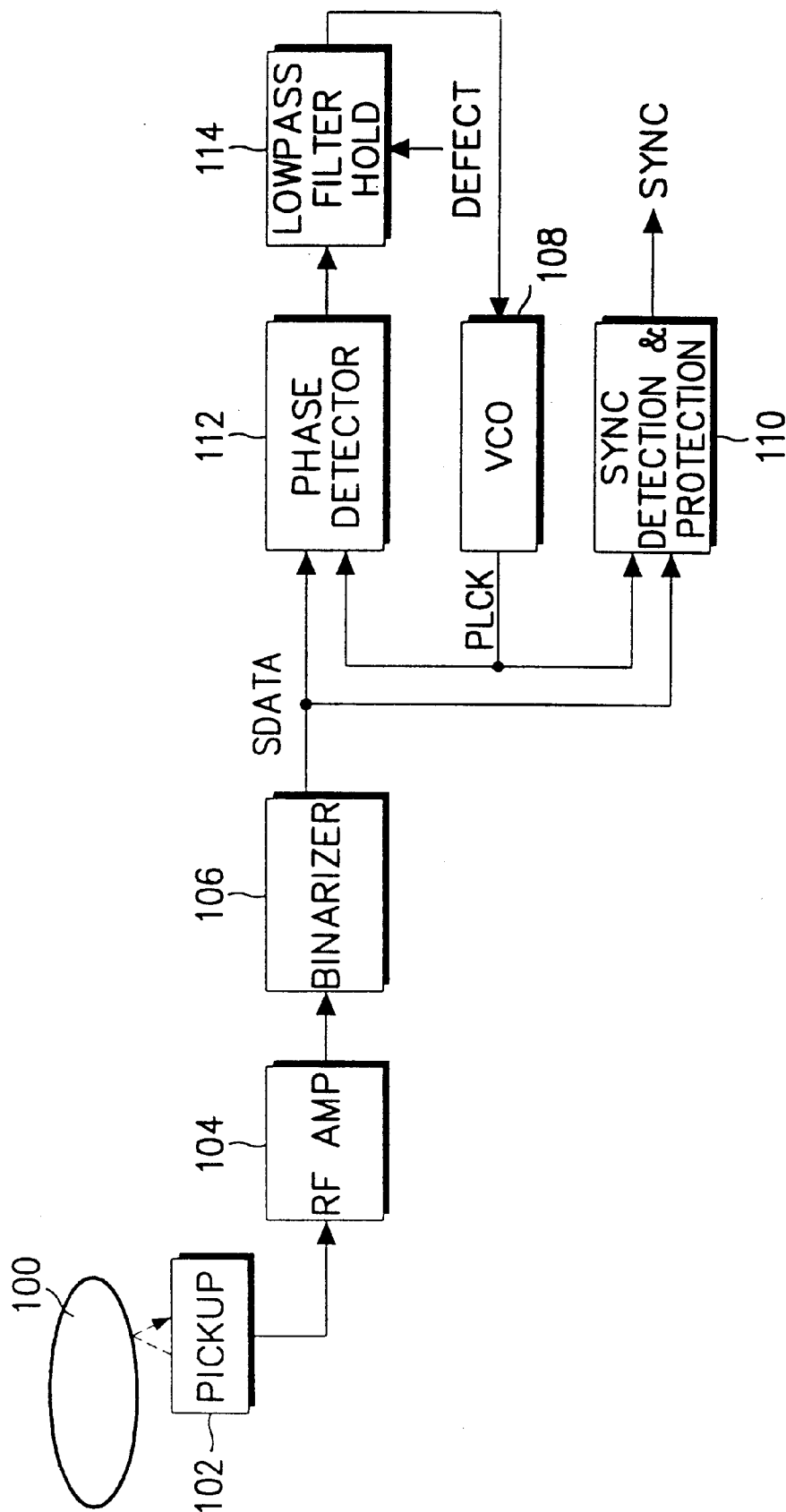
FIG. 1 is a block diagram of a conventional optical disk player.
Figure 2:
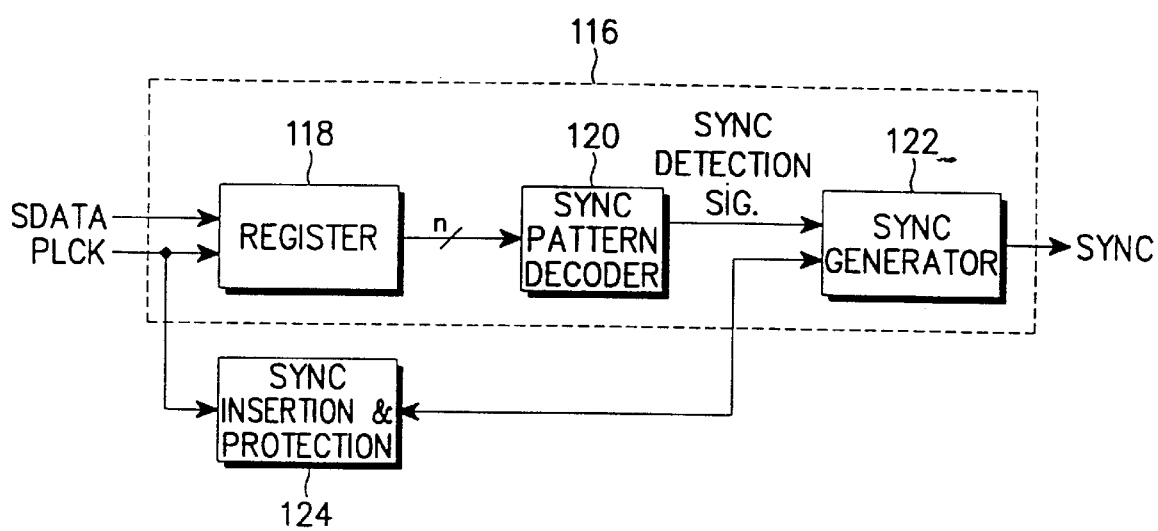
FIG. 2 is a block diagram of a sync detection and protection device as shown in FIG. 1.
Figure 3:
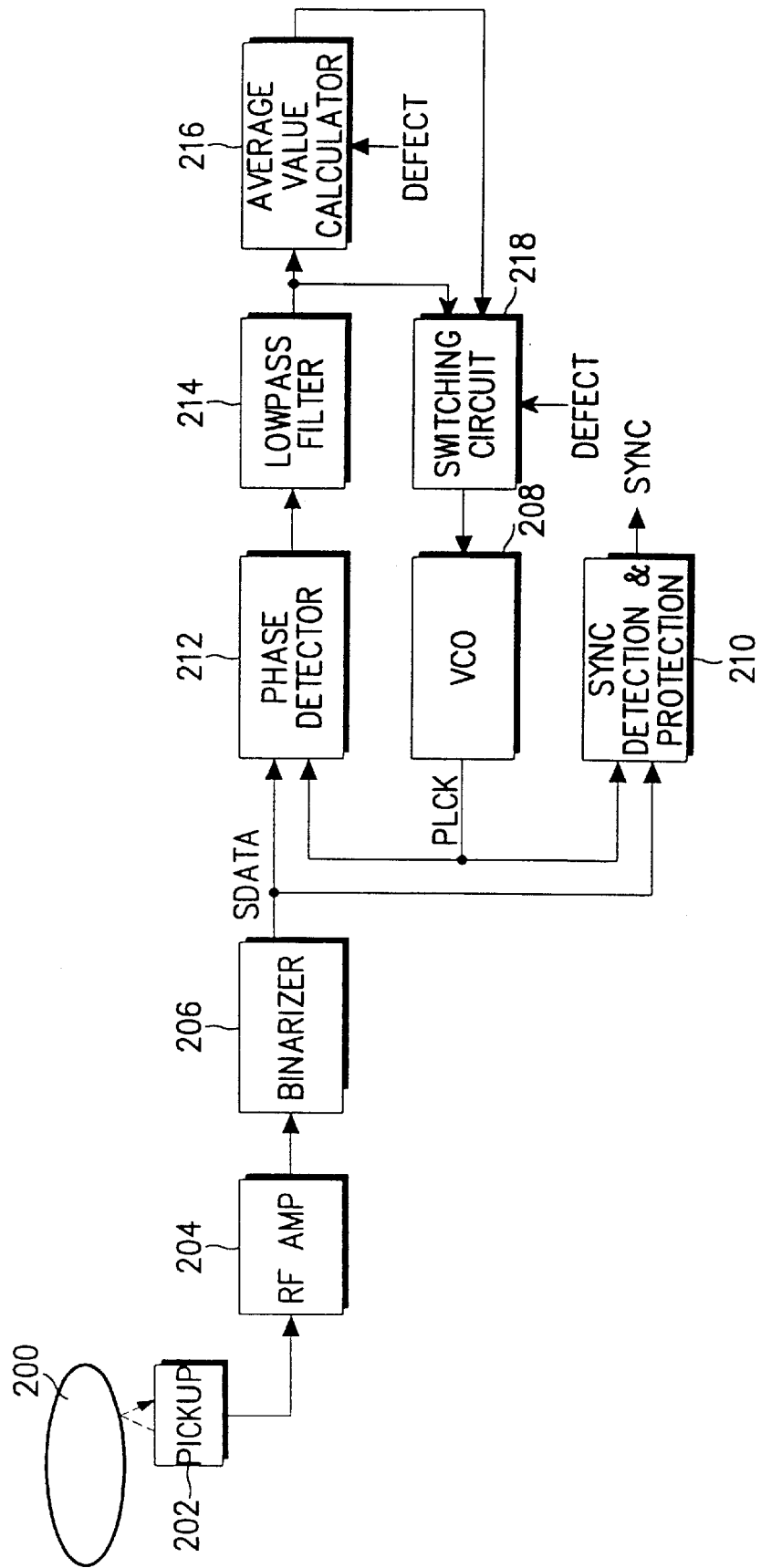
FIG. 3 is a block diagram of an optical disk player according to a preferred embodiment of the present invention.

FIG. 3 is a block diagram of an optical disk player according to a preferred embodiment of the present invention. A pickup 202 reads data recorded on an optical disk 200 and generates an RF signal according thereto. The pick-up 202 outputs the RF signal to an RF amplifier 204. The RF amplifier 204 amplifies the RF signal and outputs the amplified RF signal to a binarizer 206. The binarizer 206 binarizes the output of the RF amplifier to generate serial binary data (SDATA). The SDATA is output to a sync detection and protection device 210. The sync detection and protection device 210 receives the SDATA and a playback clock signal (PLCK) generated from a voltage controlled oscillator (VCO) 208 The sync detection and protection device 210 detects the sync signal therefrom, and protects the sync detection signal. In case the sync is not detected successfully, the sync detection and protection device 210 generates a sync insertion signal.

The PLCK signal and the SDATA are also applied to a phase detector 212. The phase detector 212 compares a phase of the PLCK signal with a phase of the SDATA to detect a phase difference therebetween. The comparison results, i.e., the detected differences, are fed back to a switching circuit 218 via a lowpass filter 214. An average value calculator 216 calculates an average value for the output of the lowpass filter 214 for a predetermined time, for use in case a defect is detected, and provides the average value to the switching circuit 218. The switching circuit 218 provides the VCO 208 with the output of the lowpass filter 214 when a defect is not detected (as included by a defect signal from a defect detection unit (not shown)), and provides the VCO 208 with the output of the average value calculator 216 when a defect is detected.

Figure 4:
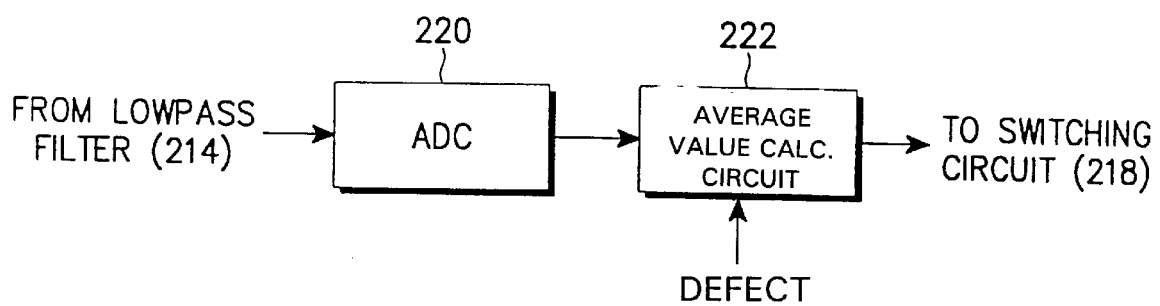
FIG. 4 is a block diagram of an average value calculator as shown in FIG. 3.

FIG. 4 is a block diagram of an average value calculator 216. The average value calculator 216 generally comprises an analog-to-digital converter (ADC) 220 and an average value calculation circuit 222 shown in FIG. 3. The output of lowpass filter 214 is converted into digital data by ADC 220. The average value calculation circuit 222 receives the output of the ADC 220 and calculates an average value about the output of the ADC 220 during a predetermined time, when defects are generated. The calculated average value is converted into an analog signal and is then provided to the switching circuit 218.

Figure 5:
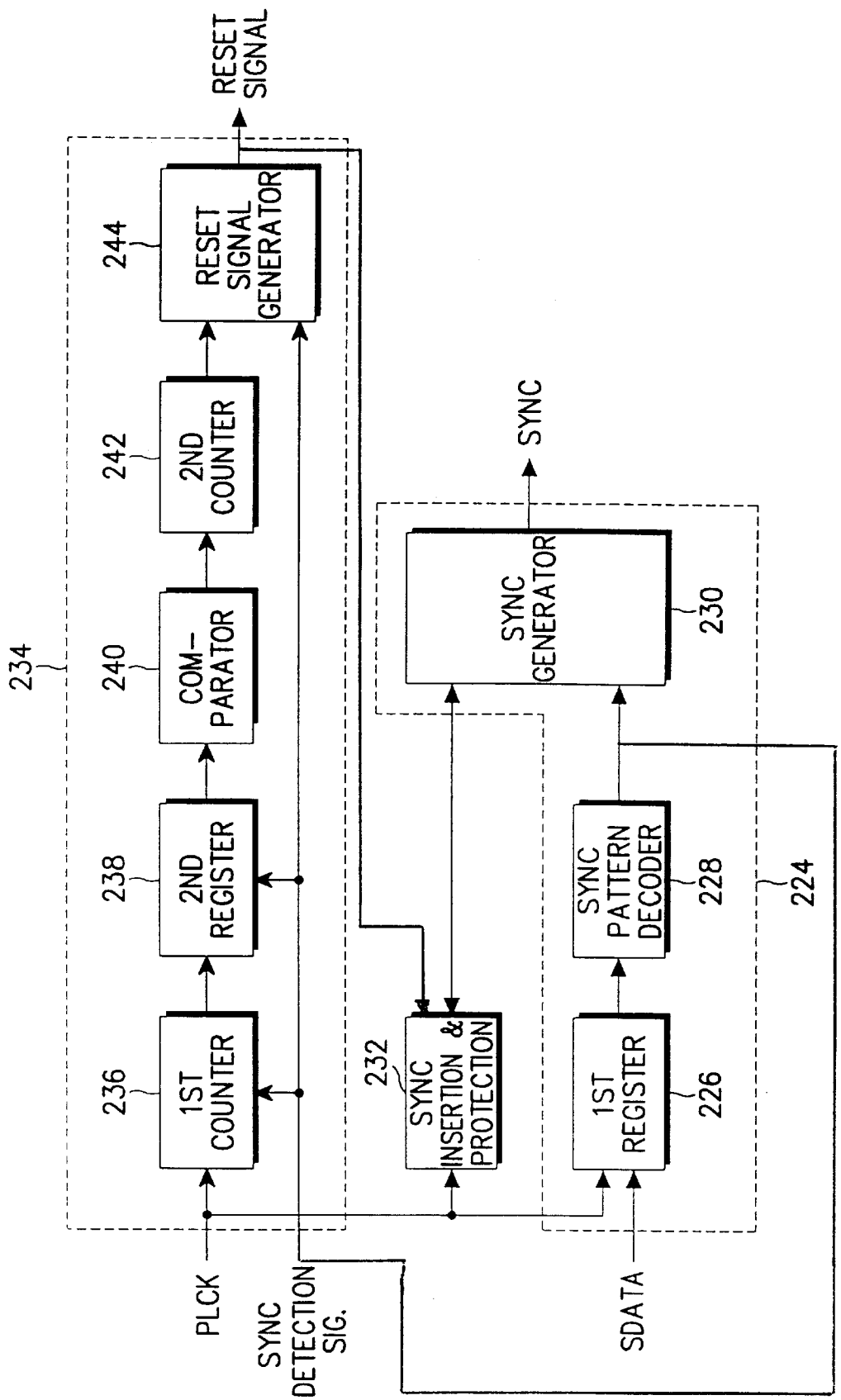
FIG. 5 is a block diagram of a sync detection and protection device as shown in FIG. 3.

FIG. 5 is a block diagram of a sync detection and protection device 210. The sync detection and protection device 210 generally comprises: a sync detector 224; a sync insertion and protection device 232; and a sync noise canceller 234. The sync detector 224 generally comprises a first register 226; a sync pattern decoder 228, and a sync generator 230. The first register 226 is a serial-input-parallel-output register, which receives the binary data (SDATA), in series, according to the playback clock (PLCK), and provides the loaded SDATA to the sync pattern decoder 228 in parallel. The sync pattern decoder 228 checks whether the SDATA from the first register 226 coincides with the sync pattern. If the SDATA is coincident with the sync pattern, the sync pattern decoder 228 generates a sync detection signal to the sync generator 230.

The sync insertion and protection device 232 sets the sync protection window, when a reset signal is received, according to the sync detection signal that the sync pattern decoder 228 has generated during resetting the sync protection window. After setting the sync protection window, the sync insertion and protection device 232 counts the PLCK and outputs a sync protection window signal to the sync generator 230 if the count value coincides with a position where the sync signal is to be generated.

The sync generator 230 checks whether the sync detection signal is generated during generation of the sync protection window signal. If the sync detection signal is generated during generation of the sync protection window signal, the sync generator 230 outputs the generated sync detection signal as the sync signal. However, if the sync detection signal is not generated during generation of the sync protection window signal, the sync generator 230 requests the sync insertion and protection device 232 to generate a sync insertion signal, and outputs the generated sync insertion signal as the sync signal.

The sync noise canceller 234 generally comprises: first and second counters 236 and 242; a second register 238; a comparator 240; and a reset signal generator 244. The first counter 236 counts the playback clock (PLCK), during the period of the sync detection signal, and loads the count value to the second register 238. The second register 238 holds the loaded count value whenever the sync detection signal is generated. The value held by the second register 238 is output to the comparator 240. The comparator 240 compares the output value of the second register 238 with a count value for a normal sync detection signal and outputs a counting clock to the second counter 242 if the count values are the same. The count value for the normal sync detection signal is determined by experiment. The detected count value can be inputted to the comparator 240 by the controller (not shown) of the optical disk player. If the counter (i.e., the counting clock value) in the second counter 242 reaches a predetermined value, the second counter 242 outputs a reset control signal to the reset signal generator 244. In response to the reset control signal, the reset signal generator 244 generates a reset signal to the sync insertion and protection device 232. Preferably, the reset signal generator 244 comprises a switching element which simply outputs the sync detection signal as a reset signal in response to the reset control signal. In response to the reset signal from the reset signal generator 244, the sync insertion and protection device 232 resets the sync protection window according to the sync detection signal.

As described above, if the sync detection signal is normally generated after the sync protection window signal is out of sync with the sync detection signal, the sync detection and protection device stops generating the sync insertion signal, and outputs the sync detection signal as the sync signal, thereby preventing damage to the data due to sync noise. Furthermore, in accordance with the present invention, the playback clock PLCK does not go out of sync (or get shifted), even though a defect is detected.

While the present invention has been described in detail with reference to the specific embodiment, it is clearly understood that many variations can be made by anyone skilled in the art within the scope and spirit of the present invention. Thus, the appropriate scope of the invention is deemed to be in accordance with the claims as set forth below.

What is claimed is:

1. A sync detection device for an optical disk player, comprising:
   a sync pattern decoder that detects a sync signal from a signal read from an optical disk and outputs a sync detection signal;
   a sync insertion and protection device that,
     when a reset signal is received, sets a sync protection window according to the sync detection signal and then counts a playback clock generated from a voltage controlled oscillator,
     generates a sync protection window signal when the count of the playback clock, as counted by said sync insertion and protection device, coincides with a position of a sync pattern, and
     outputs a sync insertion signal in response to a sync insertion request;
   a sync generator that monitors the sync detection signal and, if the sync detection signal is in sync with the sync protection window signal, outputs the sync detection signal, and if the sync detection signal is out of sync with the sync protection window signal, issues the sync insertion request to said sync insertion and protection device; and
   a sync noise canceller that counts the playback clock during generation of the sync detection signal and outputs the reset signal to said sync insertion and protection device when the count of the playback clock, as counted by said sync noise canceller, reaches a predetermined value.

2. An optical disk player for reading an optical disk comprising:
   a pickup that reads and outputs data recorded on the optical disk;
   an amplifier that amplifies the output of said pickup;
   a binarizer that binarizes the output of said amplifier;
   a voltage controlled oscillator that generates a playback clock;
   a sync detection device that receives the playback clock and the output of said binarizer and detects a sync signal therefrom;
   a phase detector that receives the playback clock and the output of said binarizer and outputs a phase difference therebetween;
   a lowpass filter that lowpass-filters the output of said phase detector;
   an average value calculator that calculates an average value for an output of the lowpass filter when a defect is detected; and
   a switching circuit that provides said voltage controlled oscillator with the output of said lowpass filter when a defect is not detected and provides said voltage controlled oscillator with the output of said average value calculator when a defect is detected, wherein said sync detection device comprises:
     a sync pattern decoder that detects the sync signal from the output of said binarizer and outputs a sync detection signal;
     a sync insertion and protection device that, when a reset signal is received, sets a sync protection window according to the sync detection signal and then counts the playback clock and generates a sync protection window signal when the count of the playback clock, as counted by said sync insertion protection device, coincides with a position of a sync pattern, said sync insertion and protection device outputs a sync insertion signal in response to a sync insertion request;
     a sync generator that monitors the sync detection signal and if the sync detection signal is in sync with the sync protection window signal outputs the sync detection signal, and if the sync detection signal is out of sync with the sync protection window signal issues the sync insertion request to said sync insertion and protection device; and
     a sync noise canceller that counts the playback clock during generation of the sync detection signal, and outputs the reset signal to said sync insertion and protection device when the count of the playback clock, as counted by said sync noise canceller, reaches a predetermined value.

3. A method of sync detection comprising:
   detecting sync from a signal read from an optical disk and outputting a sync detection signal in accordance therewith;
   counting a clock signal during generation of the sync detection signal and outputting a reset signal when the count reaches a predetermined value;
   when the reset signal is issued, setting a sync protection window according to the sync detection signal and then counting the clock signal;
   when the count of the clock signal coincides with a position of a sync pattern, outputting a sync protection window signal;
   when the sync detection signal is in sync with the sync protection window signal outputting the sync detection signal as a SYNC signal; and
   when the sync detection signal is out of sync with the sync protection window signal outputting a sync insertion signal as the SYNC signal.

4. A sync detection device comprising:
   a clock signal generator that adjusts a clock signal based on feedback;
   a phase detector that outputs a phase difference between the clock signal and a data signal;
   an average value calculator that outputs an average value of the phase difference output by said phase detector;

a switching circuit that monitors for defects and when a defect is detected feeds back the average value, outputted by said average value calculator, to said clock signal generator and when a defect is not detected feeds back the phase difference, outputted by said phase detector, to said clock signal generator; and a sync detection and protection device that receives the clock signal and the data signal and outputs a SYNC signal, wherein said sync detection and protection device comprises:

a sync insertion and detection device that can output a sync insertion signal and that, when a reset signal is received, set a sync protection window based on a sync detection signal and subsequently counts the clock signal and outputs a sync protection window signal if the clock count coincides with a position of a sync pattern;

a sync noise canceller that counts the clock signal during generation of the sync detection signal and outputs the reset signal to said sync insertion and protection device when the count, as counted by said sync noise canceller, reaches a predetermined value; and a sync detector comprising:

a sync pattern decoder that checks whether an SDATA signal coincides with the sync pattern and outputs the sync detection signal when the SDATA signal coincides with the sync pattern; and a sync generator that when the sync detection signal is output during the sync protection window outputs the sync detection signal as the SYNC signal and when the sync detection signal is not output during the sync protection window requests said insertion and protection device to generate a sync insertion signal which said sync generator outputs as the SYNC signal.

5. A sync detection device comprising:

a clock signal generation circuit that outputs a clock signal based on a phase difference between the clock signal and a data signal when no defects are detected and based on an average value of phase difference between the clock signal and the data signal when defects are detected; and a sync detection and protection device that receives the clock signal and the data signal and outputs a SYNC signal, wherein said sync detection and protection device comprises:

a sync insertion and detection device that can output a sync insertion signal and that, when a reset signal is received, set a sync protection window based on a sync detection signal and subsequently counts the clock signal and outputs a sync protection window signal if the clock count coincides with a position of a sync pattern;

a sync noise canceller that counts the clock signal during generation of the sync detection signal and outputs the reset signal to said sync insertion and protection device when the count, as counted by said sync noise canceller, reaches a predetermined value; and a sync detector comprising:

a sync pattern decoder that checks whether an SDATA signal coincides with the sync pattern and outputs the sync detection signal when the SDATA signal coincides with the sync pattern; and a sync generator that when the sync detection signal is output during the sync protection window outputs the sync detection signal as the SYNC signal and when the sync detection signal is not output during the sync protection window requests said insertion and protection device to generate a sync insertion signal which said sync generator outputs as the SYNC signal.

\* \* \* \* \*